United States Patent
Smith et al.

(10) Patent No.: US 10,005,950 B2
(45) Date of Patent: Jun. 26, 2018

(54) METHODS AND SYSTEMS FOR REMOVING GEOTHERMAL SCALE

(71) Applicant: Halliburton Energy Services, Inc., Houston, TX (US)

(72) Inventors: Alyssa Lynn Smith, Humble, TX (US); Enrique Antonio Reyes, Tomball, TX (US); Aaron Michael Beuterbaugh, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 71 days.

(21) Appl. No.: 14/907,582

(22) PCT Filed: Nov. 5, 2014

(86) PCT No.: PCT/US2014/064095
§ 371 (c)(1),
(2) Date: Jan. 26, 2016

(87) PCT Pub. No.: WO2015/088675
PCT Pub. Date: Jun. 18, 2015

(65) Prior Publication Data
US 2016/0160111 A1 Jun. 9, 2016

Related U.S. Application Data

(63) Continuation-in-part of application No. PCT/US2013/075067, filed on Dec. 13, 2013.

(51) Int. Cl.
*C09K 8/528* (2006.01)
*E21B 37/06* (2006.01)
*E21B 43/22* (2006.01)

(52) U.S. Cl.
CPC .............. *C09K 8/528* (2013.01); *E21B 37/06* (2013.01)

(58) Field of Classification Search
CPC .. C09K 8/528; C09K 8/74; C09K 8/86; E21B 37/06; E21B 43/25
See application file for complete search history.

(56) References Cited

U.S. PATENT DOCUMENTS

| 4,747,975 A | 5/1988 | Ritter |
| 4,765,913 A | 8/1988 | Featherstone |

(Continued)

FOREIGN PATENT DOCUMENTS

| EP | 40442 A1 | 11/1981 |
| EP | 2371923 A1 | 10/2011 |
| WO | 2011120655 A1 | 10/2011 |

OTHER PUBLICATIONS

Phillips et al., A Survey of Treatment Methods for Geothermal Fluids, Society of Petroleum Engineers of AIME, SPE 6606, 1977.

(Continued)

*Primary Examiner* — Zakiya W Bates
(74) *Attorney, Agent, or Firm* — McDermott Will & Emery LLP

(57) ABSTRACT

Geothermal wells frequently form deposits of geothermal scale that can detrimentally affect subterranean operations. These deposits can be very difficult to remove from a surface. Conventional procedures for addressing geothermal scale often provide inadequate scale removal, in addition to creating a number of other issues. Methods for removing geothermal scale from a wellbore can comprise: introducing a descaling agent comprising an N-(phosphonoalkyl)iminodiacetic acid or any salt thereof into a wellbore of a geothermal well having geothermal scale present therein; contacting the geothermal scale with the descaling agent; and removing at least a portion of the geothermal scale from the geothermal well using the descaling agent.

24 Claims, 1 Drawing Sheet

(56) References Cited

U.S. PATENT DOCUMENTS

| | | | |
|---|---|---|---|
| 5,096,595 | A | 3/1992 | Hwa et al. |
| 5,529,125 | A | 6/1996 | Di Lullo Arias et al. |
| 6,436,880 | B1 | 8/2002 | Frenier |
| 7,306,041 | B2 | 12/2007 | Milne et al. |
| 2004/0254079 | A1 | 12/2004 | Frenier et al. |
| 2007/0158067 | A1 | 7/2007 | Xiao et al. |
| 2011/0024366 | A1 | 2/2011 | Keatch et al. |
| 2012/0125599 | A1* | 5/2012 | Hammond Bravo ... E21B 17/20 166/105 |
| 2013/0023449 | A1 | 1/2013 | Heath et al. |
| 2015/0005216 | A1* | 1/2015 | De Wolf ............... C09K 8/54 510/188 |

OTHER PUBLICATIONS

Aboud et al., Effective Matrix Acidizing in High-Temperature Environments, Society of Petroleum Engineers, 2007 SPE Annual Technical Conference and Exhibition held in Anaheim, CA, SPE 109818.

Mahajan et al., Successes Achieved in Acidizing of Geothermal Wells in Indonesia, 2006 SPE Asia Pacific Oil & Gas Conference and Exhibition held in Adelaide, Australia, SPE 100996.

Gomez et al., Acid Stimulation of Geothermal Wells in Central America, 2009 SPE Latin American and Caribbean Petroleum Engineering Conference held in Cartegena, Colombia, SPE 121300.

International Search Report and Written Opinion for PT/US2014/064095 dated Feb. 17, 2015.

* cited by examiner

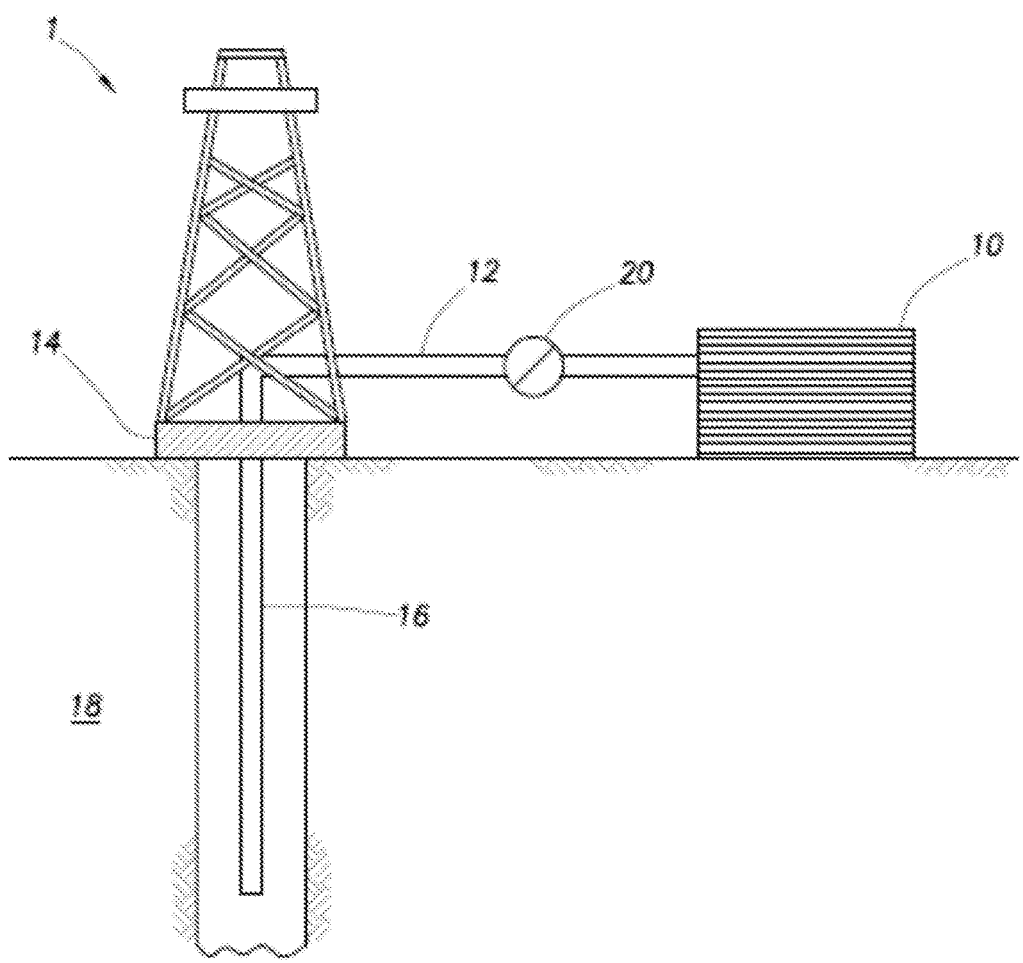

METHODS AND SYSTEMS FOR REMOVING GEOTHERMAL SCALE

CROSS-REFERENCE TO RELATED APPLICATIONS

The present application is a continuation-in-part of International Patent Application PCT/US13/75067, filed on Dec. 13, 2013.

BACKGROUND

The present disclosure generally relates to geothermal wells, and, more specifically, to methods for removing geothermal scale formed from a source of geothermal fluid.

Treatment fluids can be used in a variety of subterranean treatment operations. Such treatment operations can include, without limitation, drilling operations, stimulation operations, production operations, remediation operations, sand control treatments, and the like. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid or a component thereof, unless otherwise specified herein. More specific examples of illustrative treatment operations can include drilling operations, fracturing operations, gravel packing operations, acidizing operations, scale dissolution and removal operations, sand control operations, consolidation operations, and the like.

Scale deposits or "scaling" can represent a particular issue during various subterranean operations. In production wells, such as those producing a hydrocarbon resource, scale deposits can decrease a subterranean formation's permeability and lessen its production capacity and/or rate. Silica scales can be particularly problematic in this regard due to the extreme insolubility of silica and certain silicate species. Hydrofluoric acid or a hydrofluoric acid-generating compound are generally needed to remove silica scale. Various silica scale control additives are also available to limit the initial deposition of silica scale.

Scaling can be an especially problematic issue in geothermal wells and their associated equipment. As used herein, the term "geothermal well" refers to a well structure that establishes a fluid connection between a geothermal fluid and the earth's surface. As used herein, the term "geothermal fluid" refers to a formation fluid that is heated within a subterranean formation by a geothermal heat source. Geothermal fluids can be liquids or gases, such as geothermal brines or geothermal steam. Although geothermal fluids can represent a source of clean energy once they are brought to the earth's surface and transformed into electrical power, they can dissolve high concentrations of a wide range of chemical components, particularly metal compounds, at the fluids' high initial downhole temperatures. The dissolved components can present a number of difficulties, as discussed hereinafter.

As geothermal fluids exit the geothermally heated portion of the subterranean formation and cooling occurs, the solubility limit of the dissolved components can be exceeded and geothermal scale can form. If deposits of geothermal scale are not removed or prevented from forming, a number of deleterious consequences may result, including plugging of the well annulus, pipes, or the formation porosity. Scale-induced damage to downhole tools and surface equipment may also render the tools and equipment inoperative. Corrosion of metal goods in contact with a geothermal fluid can also present an additional difficulty. Furthermore, geothermal scale can impact the efficiency of heat exchangers used to withdraw thermal energy from the geothermal fluid, thereby decreasing the fluid's capacity for energy production.

Geothermal scales can have an exceedingly complex and variable chemical makeup. Even slight temperature differences or chemical content variability within a geothermal fluid can produce geothermal scale deposits having vastly different characteristics and compositions. As a result of this complexity, it is often not easy to predict the outcome of a geothermal scaling process, other than knowing that geothermal scaling is likely to occur. Moreover, geothermal scales can be very dense and non-porous because of their high temperature deposition conditions, often forming a crust-like deposit with a low surface area. These factors in combination with one another can make geothermal scales very difficult to remove.

A number of geothermal scales can contain a siliceous material, related to those found in silica scale. Geothermal scale deposits differ significantly from typical silica scale, however, due to the morphological properties of geothermal scale resulting from its extreme deposition temperatures and co-present metal-derived scale components. For example, the extremely dense and crust-like nature of geothermal scale can differ considerably from the amorphous silica or silicate deposits produced when acidizing a siliceous formation.

The metal-derived components of geothermal scale may be present alone or in combination with a siliceous material. In either case, the metal-derived components of geothermal scale can be problematic for the reasons noted above. Many of the metals present in geothermal scale are not commonly encountered in other scale types. Metals are commonly present in geothermal scale in the form of metal carbonates or metal sulfides. Metal sulfides can be particularly problematic due to their extreme insolubility.

As indicated above, the removal of geothermal scale can be very problematic. The density and low surface area of geothermal scale can often make it difficult to achieve sufficient chemical interaction with a treatment fluid in order to promote scale dissolution. In addition, the chemical complexity and variability of geothermal scale can make it difficult to develop a suitable descaling treatment protocol. One example of a descaling fluid presently in use for removal of geothermal scale is a 4:1 mixture of hydrochloric acid and hydrofluoric acid. However, this descaling fluid presents significant corrosion issues itself and can be costly to dispose of once spent. In addition, in order to support its use, significant cooling of the geothermal well is often required, again adding to treatment time and costs. As an alternative to chemical methods, physical removal of geothermal scale can also be conducted (e.g., by techniques such as scraping, scratching, reaming, hydrojetting, pulverizing or the like), but these techniques can be problematic to implement downhole and may mechanically damage downhole components if not performed carefully.

BRIEF DESCRIPTION OF THE DRAWING

The following FIGURE is included to illustrate certain aspects of the present disclosure and should not be viewed as an exclusive embodiment. The subject matter disclosed is capable of considerable modifications, alterations, combinations, and equivalents in form and function, as will occur to one having ordinary skill in the art and the benefit of this disclosure.

FIG. 1 shows an illustrative schematic of a system that can deliver treatment fluids of the present disclosure to a downhole location, according to one or more embodiments.

DETAILED DESCRIPTION

The present disclosure generally relates to geothermal wells, and, more specifically, to methods for removing geothermal scale formed from a source of geothermal fluid.

One or more illustrative embodiments incorporating the features of the present disclosure are presented herein. Not all features of a physical implementation are necessarily described or shown in this application for the sake of clarity. It is to be understood that in the development of a physical implementation incorporating the embodiments of the present disclosure, numerous implementation-specific decisions may be made to achieve the developer's goals, such as compliance with system-related, business-related, government-related and other constraints, which may vary by implementation and from time to time. While a developer's efforts might be time-consuming, such efforts would be, nevertheless, a routine undertaking for one having ordinary skill in the art and the benefit of this disclosure.

As discussed above, the formation of geothermal scale can produce a number of deleterious effects. In addition, once geothermal scale has formed, it can be very difficult to remove. Existing treatments for removing geothermal scale tend to be very corrosive, expensive and complicated to implement.

In order to address the shortcomings of presently used geothermal descaling techniques, the present inventors identified various descaling treatments that are particularly advantageous for use in conjunction with geothermal scale. Specifically, the inventors determined that various N-(phosphonoalkyl)iminodiacetic acids or salts thereof can be used as a descaling agent to affect removal of geothermal scale. An illustrative example of an N-(phosphonoalkyl) iminodiacetic acid that can be used in the embodiments of the present disclosure is N-(phosphonomethyl)iminodiacetic acid (PMIDA). Without being bound by theory or mechanism, it is believed that PMIDA and related descaling agents can promote dissolution of geothermal scale by complexing metal ions produced upon interaction of the descaling agent with the geothermal scale. As used herein, the terms "complexing," "complexation" and other variants thereof will refer to the formation of a metal-ligand bond. Although complexation of a metal ion may involve a chelation process in some embodiments, complexation is not deemed to be limited in this manner. PMIDA effectively complexes a wide variety of metal ions with a range of stability constants. Table 1 below shows the stability constants at 20° C. of several metal ions complexed with PMIDA.

TABLE 1

| Metal Ion | $Log_{10}$ of Stability Constant |
|---|---|
| $Mg^{2+}$ | 6.28 |
| $Ca^{2+}$ | 7.18 |
| $Sr^{2+}$ | 5.59 |
| $Ba^{2+}$ | 5.35 |

Unlike some alkaline earth phosphonates, these complexes are advantageously soluble in low pH aqueous fluids (pH=0.5-5), thereby circumventing the use of extensive pre-flushes to adjust the wellbore pH to a desired range before descaling takes place. Use of PMIDA and related descaling agents in geothermal descaling operations can provide a number of further advantages and surprising benefits, as discussed hereinafter.

PMIDA and related descaling agents are particularly compatible for use in the high temperature environment of geothermal wells, which commonly exceed a temperature of 300° F. PMIDA is thermally stable as a solid up to about 419° F. and may have an even greater stability when dissolved in a fluid phase. Accordingly, PMIDA and related descaling agents may be effectively used in a geothermal well, often without actively cooling the wellbore. Even at the high temperatures of geothermal wells, PMIDA and related descaling agents usually react with geothermal scale in a controlled manner, again allowing geothermal descaling operations to take place at the native temperature of the geothermal well and/or without taking special precautions to control the chemical reactivity. The chemical stability of PMIDA and related descaling agents can also allow treatment of geothermal scale to take place for a longer period of time than is possible with descaling agents having lower thermal stability, such as ethylenediaminetetraacetic acid (EDTA) and propylenediaminetetraacetic acid (PDTA).

As indicated above, siliceous materials are commonly present in geothermal scale. Dissolution of siliceous materials can often be promoted by hydrofluoric acid. Accordingly, it can often be advantageous to combine hydrofluoric acid or a hydrofluoric acid-generating compound with PMIDA or a related descaling agent in a treatment fluid. In this regard, PMIDA and related descaling agents are substantially stable in the presence of hydrofluoric acid. Although it can be advantageous to combine hydrofluoric acid or a hydrofluoric acid-generating compound with PMIDA, it is not a requirement for hydrofluoric acid to be present in the descaling agent in order for removal of geothermal scale to take place. This is the case even for a geothermal scale containing a siliceous material. Surprisingly, PMIDA alone can affect at least partial dissolution of geothermal scale containing a siliceous material without hydrofluoric acid or a hydrofluoric acid-generating compound being present. If needed to promote a greater degree of dissolution, however, hydrofluoric acid or a hydrofluoric acid-generating compound may also be combined with the PMIDA. In addition, by utilizing a treatment fluid that is substantially free of alkali metal ions, subsequent re-precipitation of dissolved siliceous materials in the form of highly insoluble alkali metal fluorosilicates and aluminosilicates may be avoided without resorting to solubilizing agents such as pyridinium salts, bis-quaternary ammonium salts, and poly-quaternary ammonium salts.

Although PMIDA has excellent chemical stability, it also displays some propensity toward biodegradation. As used herein, the terms "biodegradation," "biodegradable" and related variants thereof will refer to a substance that can be broken down by exposure to environmental conditions including native or non-native microbes, sunlight, air, heat, and the like. PMIDA advantageously possesses a sufficiently high chemical stability over the short term for removal of geothermal scale to take place, but a short enough biodegradation lifetime to make it environmentally friendly for various deployment situations.

In comparison to the strong acids presently used for treating geothermal scale, PMIDA and related descaling agents are further advantageous in several aspects. Since PMIDA can promote descaling with either no additional acid or less acid than that used in conventional scale treatments, spent treatment fluids containing PMIDA and related descaling agents can be less hazardous, less corrosive, and less costly to dispose of. The biodegradability of PMIDA is also desirable from a disposal standpoint. In addition, PMIDA itself is relatively inexpensive and does not greatly increase treatment costs.

Still another advantage of PMIDA and related descaling agents is that they can be initially disposed in a treatment fluid in either a dissolved state or an undissolved state. When used in an undissolved state, the descaling agent may be slurried in a viscosified treatment fluid and conveyed into a wellbore. After reaching the geothermal heat source, the descaling agent may experience an increased level of solubility as it undergoes heating. Upon becoming soluble in the treatment fluid, the descaling agent can then interact more effectively with geothermal scale. For example, above about 200° F., PMIDA may become soluble in an aqueous treatment fluid after initially being introduced to a wellbore in an undissolved state. Any viscosifying agent that is suitably compatible with the descaling agent and the geothermal conditions may be used to viscosify the treatment fluid for conveying the descaling agent into the wellbore.

The descaling methods described herein are considered to be differentiated from matrix acidizing operations due to the source and properties of the geothermal scale. Matrix acidizing operations are used to increase the porosity of a subterranean formation. Such operations take place at matrix flow rates and generate wormholes by dissolving the formation matrix, which may comprise a native carbonate mineral or a siliceous mineral. Geothermal scales, in contrast, are distinguished from the native formation matrix by their density, complex composition, and difficult removal. Geothermal descaling processes also generally do not seek to produce wormholes and utilize treatment fluid volumes that result in limited penetration into the formation matrix.

In various embodiments, methods described herein may comprise: contacting geothermal scale with a descaling agent comprising an N-(phosphonoalkyl)iminodiacetic acid or any salt thereof; dissolving at least a portion of the geothermal scale with the descaling agent to produce a metal ion; and complexing the metal ion with the N-(phosphonoalkyl)iminodiacetic acid or any salt thereof.

In various embodiments, the geothermal scale may comprise a siliceous material, a metal-containing compound, or any combination thereof. For purposes of this disclosure, both metals and metalloids, as well as any ions produced therefrom, will be considered to constitute "metals." For purposes of this disclosure, metal-containing compounds will be considered to constitute both stoichiometric and non-stoichiometric species. Siliceous materials that may be present in geothermal scale include, for example, silica, silicates, aluminosilicates, or any combination thereof.

In various embodiments, the descaling agent may be used for dissolving geothermal scale at any location in fluid communication with a source of geothermal fluid. In illustrative embodiments, the geothermal scale may be present in a wellbore in fluid communication with the source of geothermal fluid, in a fracture of a subterranean formation penetrated by the wellbore, on a tool present in the wellbore, on a surface structure in fluid communication with the wellbore, or any combination thereof. Surface structures upon which geothermal scaling can occur include, for example, above-ground or below-ground pipelines, turbines of a geothermal power plant, or any combination thereof. In more particular embodiments, the descaling agents described herein may be used for removing at least a portion of the geothermal scale present in a geothermal well, particularly in a wellbore of the geothermal well.

In some embodiments, methods described herein may comprise: introducing a descaling agent comprising an N-(phosphonoalkyl)iminodiacetic acid or any salt thereof into a wellbore of a geothermal well having geothermal scale present therein; contacting the geothermal scale with the descaling agent; and removing at least a portion of the geothermal scale from the geothermal well using the descaling agent.

In more particular embodiments, methods described herein may comprise: introducing a treatment fluid comprising a descaling agent into a wellbore of a geothermal well, the geothermal well having a bottom-hole temperature of about 300° F. or greater and having geothermal scale comprising a metal-containing compound present therein, the descaling agent comprising an N-(phosphonoalkyl)iminodiacetic acid or any salt thereof; dissolving at least a portion of the geothermal scale with the descaling agent to produce a metal ion; and complexing the metal ion with the N-(phosphonoalkyl)iminodiacetic acid.

In various embodiments, the geothermal well may have a bottom-hole temperature of about 300° F. or greater. In more particular embodiments, the bottom-hole temperature may range between about 300° F. and about 410° F., or between about 320° F. and about 400° F., or between about 350° F. and about 400° F. In some embodiments, geothermal reservoirs or wells may be so hot that it can be desirable to inject or circulate water or brine to cool the well. For instance, in geothermal wells with a bottom hole temperature of about 550° F. or greater, it can be desirable to introduce a fluid that lowers the bottom hole temperature to about 420° F. or less. Introduction of a fluid for cooling the wellbore can occur continuously or discontinuously.

The descaling agents described herein may be introduced into the wellbore of the geothermal well in a treatment fluid. The treatment fluid may comprise an aqueous or oleaginous carrier fluid as their continuous phase. Suitable aqueous carrier fluids may include, for example, fresh water, acidified water, salt water, seawater, produced water, brine (e.g., a saturated salt solution), or an aqueous salt solution (e.g., a non-saturated salt solution). Aqueous carrier fluids may be obtained from any suitable source.

In some embodiments, the aqueous carrier fluid may be chosen such that it is substantially free of alkali metal ions. For purposes of this disclosure, an aqueous carrier fluid or a treatment fluid formed therefrom will be considered to be substantially free of alkali metal ions if less than about 1 wt. % alkali metal ions are present. Choice of an aqueous carrier fluid that is substantially free of alkali metal ions may be desirable in order to limit re-precipitation of alkali metal silicates and fluorosilicates.

In some embodiments, an organic co-solvent may be included with an aqueous carrier fluid. Suitable organic co-solvents may include, but are not limited to, glycols and alcohol solvents, for example. When present, the amount of the organic co-solvent may range between about 1% to about 50% by volume of the treatment fluid.

In other various embodiments, the carrier fluid may comprise an oleaginous carrier fluid. Suitable oleaginous carrier fluids may include, for example, an organic solvent, a hydrocarbon, oil, a refined component of oil, or any combination thereof.

The N-(phosphonoalkyl)iminodiacetic acid may be introduced to the wellbore in a treatment fluid in a dissolved state, an undissolved state, or any combination thereof. As used herein, the term "slurry" will refer to any undissolved form of the N-(phosphonoalkyl)iminodiacetic acid in a fluid phase. A carrier fluid comprising the treatment fluid may be chosen to promote dissolution of the N-(phosphonoalkyl) iminodiacetic acid, if introduction in a dissolved state is desired. For example, if it is not desired to introduce solid particulates into the wellbore or if the wellbore does not have a sufficiently high temperature to promote at least partial dissolution of the N-(phosphonoalkyl)iminodiacetic acid, a dissolved form of the N-(phosphonoalkyl)iminodiacetic acid may be used. Otherwise, the N-(phosphonoalkyl) iminodiacetic acid may be present as a solid in the treatment fluid and be introduced to the geothermal well in a slurry form. Once introduced to the wellbore, the N-(phosphonoalkyl)iminodiacetic acid may be exposed to a source of geothermal heat and undergo at least partial solubilization upon heating.

The N-(phosphonoalkyl)iminodiacetic acid may be used in the descaling agent in its neutral form or in any salt form. In some embodiments, the carboxylic acid or phosphonic acid groups of the N-(phosphonoalkyl)iminodiacetic acid may be in a salt form, particularly an ammonium or quaternary ammonium salt form. Use of an ammonium or quaternary ammonium salt form for the acid groups avoids introducing alkali metal ions into the wellbore, which can be undesirable for the reasons noted above. The protonated form of the acid groups also desirably avoids introducing unwanted alkali metal ions into the wellbore. In other various embodiments, the amine group of the N-(phosphonoalkyl)iminodiacetic acid may be used in a salt form. The amine salt form may comprise a protonated salt form, such as a hydrochloride or formate salt form, or a quaternized salt form.

In various embodiments, the neutral form of the N-(phosphonoalkyl)iminodiacetic acid that is present in the descaling agent may have the structure shown in Formula 1

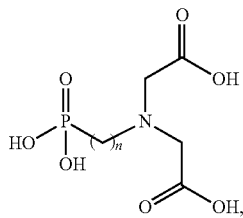

Formula 1 wherein n is an integer ranging between 1 and about 5. A carbon chain length of this range may be beneficial in promoting aqueous solubility of the N-(phosphonoalkyl) iminodiacetic acid. In more specific embodiments, a particularly suitable N-(phosphonoalkyl)iminodiacetic acid for practicing the disclosure herein can be N-(phosphonomethyl)iminodiacetic acid, in which n is 1.

In some embodiments, an acid or acid-generating compound may be present in the descaling agent in combination with the N-(phosphonoalkyl)iminodiacetic acid. The presence of an acid in the scaling agent may be used to adjust the protonation state and salt form of the N-(phosphonoalkyl) iminodiacetic acid. In various embodiments, the descaling agent may be present in a treatment fluid having a pH of about 4 or lower, or about 3.5 or lower, or about 3 or lower, or about 2.5 or lower, or about 2 or lower, or about 1.5 or lower, or about 1 or lower. In more specific embodiments, the descaling agent may be present in a treatment fluid having a pH ranging between about 0 and about 4, or between about 1 and about 4, or between about 1 and about 3, or between about 2 and about 4. Although the N-(phosphonoalkyl)iminodiacetic acid alone may be sufficient to at least partially remove geothermal scale, incorporation of an acid or acid-generating compound may result in more effective removal of geothermal scale by promoting its dissolution. Hydrofluoric acid or a hydrofluoric acid-generating compound may be particularly effective in promoting removal of geothermal scale.

The pH of the treatment fluid may be chosen such that the N-(phosphonoalkyl)iminodiacetic acid is initially fully protonated, or the pH may be chosen such that one or more of the acid groups of the N-(phosphonoalkyl)iminodiacetic acid is deprotonated. When fully protonated, the N-(phosphonoalkyl)iminodiacetic acid may initially be insufficient to promote complexation of a metal ion. However, as the treatment fluid spends and the pH rises, the N-(phosphonoalkyl)iminodiacetic acid may become at least partially deprotonated in order to affect complexation of a metal ion.

Examples of acids suitable for inclusion in the descaling agents described herein may include, but are not limited to, hydrochloric acid, hydrobromic acid, hydrofluoric acid, formic acid, acetic acid, chloroacetic acid, dichloroacetic acid, trichloroacetic acid, fluoroacetic acid, difluoroacetic acid, trifluoroacetic acid, methanesulfonic acid, the like, and any combination thereof. Examples of suitable acid-generating compounds may include, but are not limited to, esters, aliphatic polyesters, orthoesters, poly(orthoesters), poly(lactides), poly(glycolides), poly(ε-caprolactones), poly(hydroxybutyrates), poly(anhydrides), ethylene glycol monoformate, ethylene glycol diformate, diethylene glycol diformate, glyceryl monoformate, glyceryl diformate, glyceryl triformate, triethylene glycol diformate, formate esters of pentaerythritol, the like, any derivative thereof, and any combination thereof.

In some embodiments, the descaling agents described herein may be substantially free of hydrofluoric acid or a hydrofluoric acid-generating compound. In other embodiments, the descaling agents may further comprise hydrofluoric acid or a hydrofluoric acid-generating compound. When present or generatable, hydrofluoric acid or a precursor thereof may comprise up to about 20 wt. % of the descaling agent. In more particular embodiments, the descaling agent may comprise up to about 15 wt. % hydrofluoric acid, or up to about 10% hydrofluoric acid, or up to about 5 wt. % hydrofluoric acid. Suitable hydrofluoric acid-generating compounds may include substances such as, for example, fluoroboric acid, fluorosulfuric acid, hexafluorophosphoric acid, hexafluoroantimonic acid, difluorophosphoric acid, hexafluorosilicic acid, potassium hydrogen difluoride, sodium hydrogen difluoride, polyvinylammonium fluoride, polyvinylpyridinium fluoride, pyridinium fluoride, imidazolium fluoride, ammonium fluoride, tetrafluoroborate salts, hexafluoroantimonate salts, hexafluorophosphate salts, bifluoride salts (e.g., ammonium bifluoride), perfluorinated organic compounds, and various boron trifluoride complexes.

In various embodiments, removing at least a portion of the geothermal scale may comprise dissolving at least a portion of the geothermal scale with the descaling agent to produce a metal ion, and complexing the metal ion with the N-(phosphonoalkyl)iminodiacetic acid or any salt thereof. In some embodiments, the N-(phosphonoalkyl)iminodiacetic acid may promote dissolution of the geothermal scale by directly complexing the metal ion. In other embodiments, dissolution of the geothermal scale may be promoted by other components of the descaling agent, and complexation of the metal ion by the N-(phosphonoalkyl)iminodiacetic acid may occur thereafter. In either case, complexation of the metal ion by the N-(phosphonoalkyl)iminodiacetic acid may substantially prevent re-precipitation of an insoluble form of the metal ion.

In various embodiments, the geothermal scale being treated according to the disclosure herein may comprise a metal-containing compound. As indicated above, the metal-containing compound may be dissolved by the descaling agent to produce a metal ion. The metal-containing compound comprising the geothermal scale may comprises various salt species such as, for example, carbonates, sulfates, sulfides, chlorides, and any combination thereof. Carbonates and sulfides may be particularly prevalent in geothermal scale. Silicon-containing salts, such as calcium silicates, may also be present in combination with such salts, as discussed further below. In various embodiments, the metal ion produced by dissolution of the geothermal scale may be selected from the group consisting of an iron ion, a copper ion, a silver ion, a magnesium ion, a calcium ion, an aluminum ion, a manganese ion, a nickel ion, a barium ion, a strontium ion, a zirconium ion, a zinc ion, a titanium ion, a tin ion, a beryllium ion, a potassium ion, an antimony ion, an arsenic ion, and any combination thereof. Although re-precipitation of some of these metal ions (e.g., iron, calcium and aluminum) in an insoluble form may sometimes occur during matrix acidizing operations, the re-precipitated metal ions differ from geothermal scale for the reasons discussed above. In addition, geothermal scale frequently comprises a complex mixture of a majority of the foregoing metal ions, many of which are infrequently, if ever, observed during matrix acidizing operations. Metal ions that may be particularly prevalent in combination with one another include, for example, silver ions, iron ions, copper ions, antimony ions, and arsenic ions. The complex mixture of metal-containing compounds can significantly complicate the removal of geothermal scale.

In further embodiments, the geothermal scale may further comprise a siliceous material in addition to a metal-containing compound. Siliceous materials that may be present in the geothermal scale include, for example, silica, silicates, aluminosilicates or any combination thereof. In some embodiments, the siliceous material present in the geothermal scale may also comprise one or more metal ions, such as a metal silicate (e.g., calcium silicate), as discussed above. In various embodiments, the geothermal scale may comprise up to about 50 wt. % of the siliceous material.

In embodiments where both a metal-containing compound and a siliceous material are present in the geothermal scale, it may be advantageous to include hydrofluoric acid or a hydrofluoric acid-generating compound in the descaling agent. As discussed above, hydrofluoric acid may promote more effective dissolution or removal of the geothermal scale than if it is not present. However, the descaling agents of the present disclosure may also be substantially free of hydrofluoric acid or generated hydrofluoric acid, while still remaining effective for removal of geothermal scale, even geothermal scale containing a siliceous material. Health and safety concerns, for example, may lead to omission of hydrofluoric acid or a hydrofluoric acid-generating compound from the descaling agent.

In still other embodiments, the descaling agent may be introduced into the wellbore of the geothermal well in a treatment fluid that is substantially free of alkali metal ions. More specifically, the descaling agent may be introduced into the wellbore in a treatment fluid that contains about 1 wt. % or less alkali metal ions. As indicated above, by maintaining the treatment fluid containing the descaling agent in a substantially alkali metal-free state, the risk of possible re-precipitation of highly insoluble alkali metal fluorosilicates and aluminosilicates may be decreased.

In alternative embodiments, the geothermal well may be flushed with a substantially alkali metal-free treatment fluid before introducing a treatment fluid containing the descaling agent to the wellbore. For example, a treatment fluid containing an ammonium or quaternary ammonium salt may be used to displace a plurality of alkali metal ions from the wellbore. Thereafter, the N-(phosphonoalkyl)iminodiacetic acid or an alkali metal-free salt thereof may be introduced to the wellbore in order to affect removal of at least a portion of the geothermal scale therefrom.

In some embodiments, the concentration of the descaling agent in the treatment fluid may range from about 0.1 wt. % to about 50 wt. %. In more particular embodiments, the concentration may range between about 0.5 wt. % and about 25 wt. %, or between about 1 wt. % to about 15 wt. %.

In additional embodiments, the treatment fluids described herein may further comprise any number of additives that are commonly used in downhole operations including, for example, silica scale control additives, surfactants, gel stabilizers, anti-oxidants, polymer degradation prevention additives, relative permeability modifiers, scale inhibitors, corrosion inhibitors, foaming agents, defoaming agents, antifoaming agents, emulsifying agents, de-emulsifying agents, iron control agents, proppants or other particulates, particulate diverters, salts, acids, fluid loss control additives, gas, catalysts, clay control agents, dispersants, flocculants, scavengers (e.g., $H_2S$ scavengers, $CO_2$ scavengers or $O_2$ scavengers), gelling agents, lubricants, friction reducers, bridging agents, viscosifiers, weighting agents, solubilizers, pH control agents (e.g., buffers), hydrate inhibitors, consolidating agents, bactericides, catalysts, clay stabilizers, breakers, delayed release breakers, and the like. Combinations of these additives can be used as well. One of ordinary skill in the art will be able to formulate a treatment fluid having properties suitable for a given application.

In other various embodiments, systems configured for delivering a descaling agent to a downhole location are described. In various embodiments, the systems can comprise a pump fluidly coupled to a tubular, the tubular containing a treatment fluid comprising a descaling agent comprising an N-(phosphonoalkyl)iminodiacetic acid or any salt thereof.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce a treatment fluid of the present disclosure to a subterranean formation at or above a fracture gradient of the subterranean formation, but it may also be used in cases where fracturing is not desired. The treatment fluids described herein may be introduced with a high pressure pump, or they may be introduced following a treatment fluid that was introduced with a high pressure pump. In some embodiments, the high pressure pump may be capable of fluidly conveying particulate matter into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of a treatment fluid before it reaches the high pressure pump. Alternately, the low pressure pump may be used to directly introduce the treatment fluid to the subterranean formation.

In some embodiments, the systems described herein can further comprise a mixing tank that is upstream of the pump and in which the pressure-mitigating material is formulated with a carrier fluid. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

FIG. 1 shows an illustrative schematic of a system that can deliver treatment fluids of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluid of the present disclosure may be formulated. The treatment fluid may be conveyed via line 12 to wellhead 14, where the treatment fluid enters tubular 16, tubular 16 extending from wellhead 14 into subterranean formation 18. Tubular 16 may include orifices that allow the treatment fluid to enter into the wellbore. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18. In other embodiments, the treatment fluid may flow back to wellhead 14 in a produced hydrocarbon fluid from subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A. Methods for removing geothermal scale from a wellbore. The methods comprise: introducing a descaling agent comprising an N-(phosphonoalkyl)iminodiacetic acid or any salt thereof into a wellbore of a geothermal well having geothermal scale present therein; contacting the geothermal scale with the descaling agent; and removing at least a portion of the geothermal scale from geothermal well using the descaling agent.

B. Methods for removing geothermal scale from a wellbore by complexing a metal ion. The methods comprise: introducing a treatment fluid comprising a descaling agent into a wellbore of a geothermal well, the geothermal well having a bottom-hole temperature of about 300° F. or greater and having geothermal scale comprising a metal-containing compound present therein, the descaling agent comprising an N-(phosphonoalkyl)iminodiacetic acid or any salt thereof; dissolving at least a portion of the geothermal scale with the descaling agent to produce a metal ion; and complexing the metal ion with the N-(phosphonoalkyl)iminodiacetic acid.

C. Methods for removing geothermal scale by complexing a metal ion. The methods comprise: contacting geothermal scale with a descaling agent comprising an N-(phosphonoalkyl)iminodiacetic acid or any salt thereof; dissolving at least a portion of the geothermal scale with the descaling agent to produce a metal ion; and complexing the metal ion with the N-(phosphonoalkyl)iminodiacetic acid or any salt.

D. Systems for introducing a descaling agent into a wellbore. The systems comprise: a pump fluidly coupled to a tubular, the tubular containing a treatment fluid comprising a descaling agent comprising an N-(phosphonoalkyl)iminodiacetic acid or any salt thereof.

Each of embodiments A-D may have one or more of the following additional elements in any combination:

Element 1: wherein removing at least a portion of the geothermal scale comprises dissolving at least a portion of the geothermal scale with the descaling agent to produce a metal ion, and complexing the metal ion with the N-(phosphonoalkyl)iminodiacetic acid or any salt thereof.

Element 2: wherein the metal ion comprises at least one metal ion selected from the group consisting of an iron ion, a copper ion, a silver ion, a magnesium ion, a calcium ion, an aluminum ion, a manganese ion, a nickel ion, a barium ion, a strontium ion, a zirconium ion, a zinc ion, a titanium ion, a tin ion, a beryllium ion, an antimony ion, an arsenic ion, and any combination thereof.

Element 3: wherein the geothermal scale comprises a siliceous material and a metal-containing compound.

Element 4: wherein the descaling agent further comprises hydrofluoric acid or a hydrofluoric acid-generating compound.

Element 5: wherein the descaling agent is introduced into the wellbore in a treatment fluid that contains about 1 wt. % or less alkali metal ions.

Element 6: wherein the geothermal scale comprises up to about 50 wt. % of the siliceous material.

Element 7: wherein the siliceous material comprises silica, a silicate, an aluminosilicate, or any combination thereof.

Element 8: wherein the geothermal well has a bottom-hole temperature of about 300° F. or greater.

Element 9: wherein the geothermal scale is present in the wellbore, in a fracture of a subterranean formation penetrated by the wellbore, on a tool present in the wellbore, or any combination thereof.

Element 10: wherein the N-(phosphonoalkyl)iminodiacetic acid has a structure of

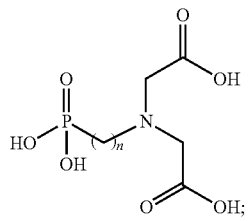

wherein n is an integer ranging between 1 and about 5.

Element 11: wherein the N-(phosphonoalkyl)iminodiacetic acid comprises N-(phosphonomethyl)iminodiacetic acid or any salt thereof.

Element 12: wherein the treatment fluid contains about 1 wt. % or less alkali metal ions.

Element 13: wherein the geothermal scale further comprises a siliceous material.

Element 14: wherein the N-(phosphonoalkyl)iminodiacetic acid or any salt thereof is present as a solid in the treatment fluid and is introduced to the geothermal well in a slurry form.

Element 15: wherein the geothermal scale is present in a wellbore, in a fracture of a subterranean formation penetrated by the wellbore, on a tool present in the wellbore, on a surface structure in fluid communication with the wellbore, or any combination thereof.

By way of non-limiting example, exemplary combinations applicable to A-D include:

The method of A in combination with elements 1 and 2.
The method of A in combination with elements 3 and 4.
The method of A in combination with elements 1, 3 and 4.
The method of A in combination with elements 3 and 7.
The method of A in combination with elements 1 and 8.
The method of A in combination with elements 4 and 9.
The method of A in combination with elements 1 and 11.
The method of B in combination with elements 2 and 4.
The method of B in combination with elements 3 and 5.
The method of B in combination with elements 3 and 9.
The method of B in combination with elements 10 and 15.
The method of C in combination with elements 3 and 6.
The method of C in combination with elements 2 and 3.
The method of C in combination with elements 3 and 15.
The system of D in combination with elements 4 and 10.
The system of D in combination with elements 4 and 12.
The system of D in combination with elements 11 and 12.

To facilitate a better understanding of the embodiments of the present disclosure, the following examples of preferred or representative embodiments are given. In no way should the following examples be read to limit, or to define, the scope of the disclosure.

EXAMPLES

Example 1: Use of PMIDA in Scale Removal

An illustrative geothermal scale was provided with the following composition: copper chloride hydroxide [CuCl(OH)$_3$], cuprous oxide [Cu$_2$O], copper antimony [Cu$_2$Sb], goethite [FeO(OH)], iron chloride [FeCl$_2$] and amorphous silica [SiO$_2$ or SiO$_2$(OH)$_2$]. Thereafter the geothermal scale was treated with two treatment fluids containing PMIDA, one containing generated hydrofluoric acid and one without, as specified in Table 2. In each test, the temperature was 350° C., the contact time was 4 hours, and the pressure was 500 psi.

TABLE 2

| Sample I.D. | Amount of PMIDA (g) | Amount of Ammonium Bifluoride (g) | Volume of Water (mL) | Mass of Scale Before Treatment (g) | Mass of Scale After Treatment (g) | Percent Dissolution (%) |
| --- | --- | --- | --- | --- | --- | --- |
| 1 | 10 | 0 | 100 | 0.9879 | 0.6084 | 38.5 |
| 2 | 10 | 8 | 100 | 0.9962 | 0.2468 | 75.2 |

As can be seen from Table 2, both samples 1 and 2 were effective for removing the geothermal scale, even though sample 2, containing generated hydrofluoric acid, removed a greater amount of the geothermal scale over the same treatment time. This indicates that PMIDA alone promotes the dissolution of geothermal scale, albeit at a slower rate.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is

The invention claimed is:

1. A method comprising:
introducing a descaling agent comprising an N-(phosphonoalkyl)iminodiacetic acid or any salt thereof into a wellbore of a geothermal well, the geothermal well having a bottom-hole temperature of about 300° F. or greater and having geothermal scale present therein;
contacting the geothermal scale with the descaling agent; and
removing at least a portion of the geothermal scale from the geothermal well using the descaling agent,
wherein removing at least a portion of the geothermal scale comprises dissolving at least a portion of the geothermal scale with the descaling agent to produce a metal ion, and complexing the metal ion with the N-(phosphonoalkyl)iminodiacetic acid or any salt thereof, and wherein the geothermal scale comprises a siliceous material and a metal-containing compound.

2. The method of claim 1, wherein the metal ion comprises at least one metal ion selected from the group consisting of an iron ion, a copper ion, a silver ion, a magnesium ion, a calcium ion, an aluminum ion, a manganese ion, a nickel ion, a barium ion, a strontium ion, a zirconium ion, a zinc ion, a titanium ion, a tin ion, a beryllium ion, an antimony ion, an arsenic ion, and any combination thereof.

3. The method of claim 1, wherein the descaling agent further comprises hydrofluoric acid or a hydrofluoric acid-generating compound.

4. The method of claim 3, wherein the descaling agent is introduced into the wellbore in a treatment fluid that contains about 1 wt. % or less alkali metal ions.

5. The method of claim 1, wherein the geothermal scale comprises up to about 50 wt. % of the siliceous material.

6. The method of claim 1, wherein the siliceous material comprises silica, a silicate, an aluminosilicate, or any combination thereof.

7. The method of claim 1, wherein the geothermal scale is present in the wellbore, in a fracture of a subterranean formation penetrated by the wellbore, on a tool present in the wellbore, or any combination thereof.

8. The method of claim 1, wherein the descaling agent further comprises hydrofluoric acid or a hydrofluoric acid-generating compound.

9. The method of claim 1, wherein the N-(phosphonoalkyl)iminodiacetic acid has a structure of wherein n is an integer ranging between 1 and about 5.

10. The method of claim 9, wherein the N-(phosphonoalkyl)iminodiacetic acid comprises N-(phosphonomethyl)iminodiacetic acid or any salt thereof.

11. A method comprising:
introducing a treatment fluid comprising a descaling agent into a wellbore of a geothermal well, the geothermal well having a bottom-hole temperature of about 300° F. or greater and having geothermal scale comprising a metal-containing compound present therein, the descaling agent comprising an N-(phosphonoalkyl)iminodiacetic acid or any salt thereof;
dissolving at least a portion of the geothermal scale with the descaling agent to produce a metal ion; and
complexing the metal ion with the N-(phosphonoalkyl)iminodiacetic acid.

12. The method of claim 11, wherein the treatment fluid contains about 1 wt. % or less alkali metal ions.

13. The method of claim 11, wherein the metal ion comprises at least one metal ion selected from the group consisting of an iron ion, a copper ion, a silver ion, a magnesium ion, a calcium ion, an aluminum ion, a manganese ion, a nickel ion, a barium ion, a strontium ion, a zirconium ion, a zinc ion, a titanium ion, a tin ion, a beryllium ion, an antimony ion, an arsenic ion, and any combination thereof.

14. The method of claim 11, wherein the geothermal scale further comprises a siliceous material.

15. The method of claim 14, wherein the descaling agent further comprises hydrofluoric acid or a hydrofluoric acid-generating compound.

16. The method of claim 14, wherein the geothermal scale comprises up to about 50 wt. % of the siliceous material.

17. The method of claim 11, wherein the descaling agent further comprises hydrofluoric acid or a hydrofluoric acid-generating compound.

18. The method of claim 11, wherein the N-(phosphonoalkyl)iminodiacetic acid has a structure of wherein n is an integer ranging between 1 and about 5.

19. The method of claim 18, wherein the N-(phosphonoalkyl)iminodiacetic acid comprises N-(phosphonomethyl)iminodiacetic acid or any salt thereof.

20. The method of claim 11, wherein the N-(phosphonoalkyl)iminodiacetic acid or any salt thereof is present as a solid in the treatment fluid and is introduced to the geothermal well in a slurry form.

21. A method comprising:
- contacting geothermal scale with a descaling agent comprising an N-(phosphonoalkyl)iminodiacetic acid or any salt thereof;
- dissolving at least a portion of the geothermal scale with the descaling agent to produce a metal ion; and
- complexing the metal ion with the N-(phosphonoalkyl) iminodiacetic acid or any salt.

22. The method of claim 21, wherein the descaling agent further comprises hydrofluoric acid or a hydrofluoric acid-generating compound.

23. The method of claim 21, wherein the geothermal scale is present in a wellbore, in a fracture of a subterranean formation penetrated by the wellbore, on a tool present in the wellbore, on a surface structure in fluid communication with the wellbore, or any combination thereof.

24. A system comprising:
- a pump fluidly coupled to a tubular, the tubular containing a treatment fluid comprising a descaling agent comprising an N-(phosphonoalkyl)iminodiacetic acid or any salt thereof,
- wherein the tubular extends into a wellbore of a geothermal well, the geothermal well having a bottom-hole temperature of about 300° F. or greater and having geothermal scale present therein, wherein removing at least a portion of the geothermal scale comprises dissolving at least a portion of the geothermal scale with the descaling agent to produce a metal ion, and complexing the metal ion with the N-(phosphonoalkyl) iminodiacetic acid or any salt thereof, and wherein the geothermal scale comprises a siliceous material and a metal-containing compound.

* * * * *